(12) United States Patent
Lin et al.

(10) Patent No.: US 9,002,190 B2
(45) Date of Patent: Apr. 7, 2015

(54) OPTICAL ANTI-SHAKE DRIVING STRUCTURE

(71) Applicant: Hon Hai Precision Industry Co., Ltd., New Taipei (TW)

(72) Inventors: Jun-Han Lin, New Taipei (TW); An-Tze Lee, New Taipei (TW); Sheng-An Wang, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 2 days.

(21) Appl. No.: 13/854,993

(22) Filed: Apr. 2, 2013

(65) Prior Publication Data

US 2013/0340548 A1    Dec. 26, 2013

(30) Foreign Application Priority Data

Jun. 20, 2012   (TW) .............................. 101122022 A

(51) Int. Cl.
  *G03B 17/00*   (2006.01)
  *H04N 5/232*   (2006.01)
  *H04N 5/225*   (2006.01)

(52) U.S. Cl.
  CPC ......... *H04N 5/23287* (2013.01); *H04N 5/2254* (2013.01)

(58) Field of Classification Search
  USPC ................................. 396/52, 55; 348/208.99
  See application file for complete search history.

(56) References Cited

U.S. PATENT DOCUMENTS

| 7,653,294 | B2 * | 1/2010 | Ishii et al. ........................ 396/55 |
| 8,086,098 | B2 * | 12/2011 | Tanaka .............................. 396/55 |
| 8,165,462 | B2 * | 4/2012 | Byon et al. ....................... 396/55 |
| 8,184,966 | B2 * | 5/2012 | Tsutsumi et al. ................ 396/55 |
| 8,190,008 | B2 * | 5/2012 | Wu et al. .......................... 396/55 |
| 8,218,016 | B2 * | 7/2012 | Park et al. ................. 348/208.11 |
| 2009/0059372 | A1 * | 3/2009 | Kawauchi et al. ............ 359/554 |

FOREIGN PATENT DOCUMENTS

| TW | 200839420 A | 10/2008 |
| TW | 201038971 A | 11/2010 |

* cited by examiner

*Primary Examiner* — Clayton E LaBalle
*Assistant Examiner* — Warren K Fenwick
(74) *Attorney, Agent, or Firm* — Novak Druce Connolly Bove + Quigg LLP

(57) ABSTRACT

An optical anti-shake driving structure includes a base, a sliding platform, a driving device and a limiting device. At least two guide rods are set on the base, the guide rod is set on the same plane as the base. The sliding platform suspended on the guide rods and having a lens set within a hole on the sliding platform, the lens aligned with a light transmissive hole of the base. The driving device set on the base to drive the sliding platform, the limiting device set on the base to limit the displacement range of the sliding platform. The components of the driving structure are simplified, of a greatly reduced thickness, are easy to assembly, as well as lowering cumulative tolerances.

13 Claims, 3 Drawing Sheets

OPTICAL ANTI-SHAKE DRIVING STRUCTURE

BACKGROUND

1. Technical Field

The present disclosure relates to a optical anti-shake driving structure, and particularly to displacement in a plane of a lens on a single sliding platform for optical compensation of shaking

2. Description of Related Art

Image capturing devices suffer from blurry images, mainly from vibration of the image capturing devices. A common method used to resolve the problem is to move camera lens of the image capturing devices in an optical path to carry out optical axis offset compensation. This manner requires a drive structure for driving movement of the camera lens along a plane displacement perpendicular to the lens optical axis (Z axis) to achieve compensation. Therefore, the driving structure for this method usually has two axially sliding platforms, where the lens is set within a sliding platform, then laminated together with the two sliding platforms, and then driven. The driving structure includes two sets of a plane driving members, resulting in a greater thickness of the structural body, and is not conductive to an energy saving design. Further, the driving structure has many components, where accumulating tolerance between the components reduces accuracy of the control displacement. Further, assembly of the driving structure is complex and inconvenient.

Therefore, it is necessary to overcome the above-mentioned problems.

BRIEF DESCRIPTION OF THE DRAWINGS

Many aspects of the anti-shake driving structure can be better understood with reference to the following drawings. The components in the drawings are not necessarily drawn to scale, the emphasis instead being placed upon clearly illustrating the principles of the present anti-shake driving structure. In the drawings, all the views are schematic.

DETAILED DESCRIPTION

Figure 1:
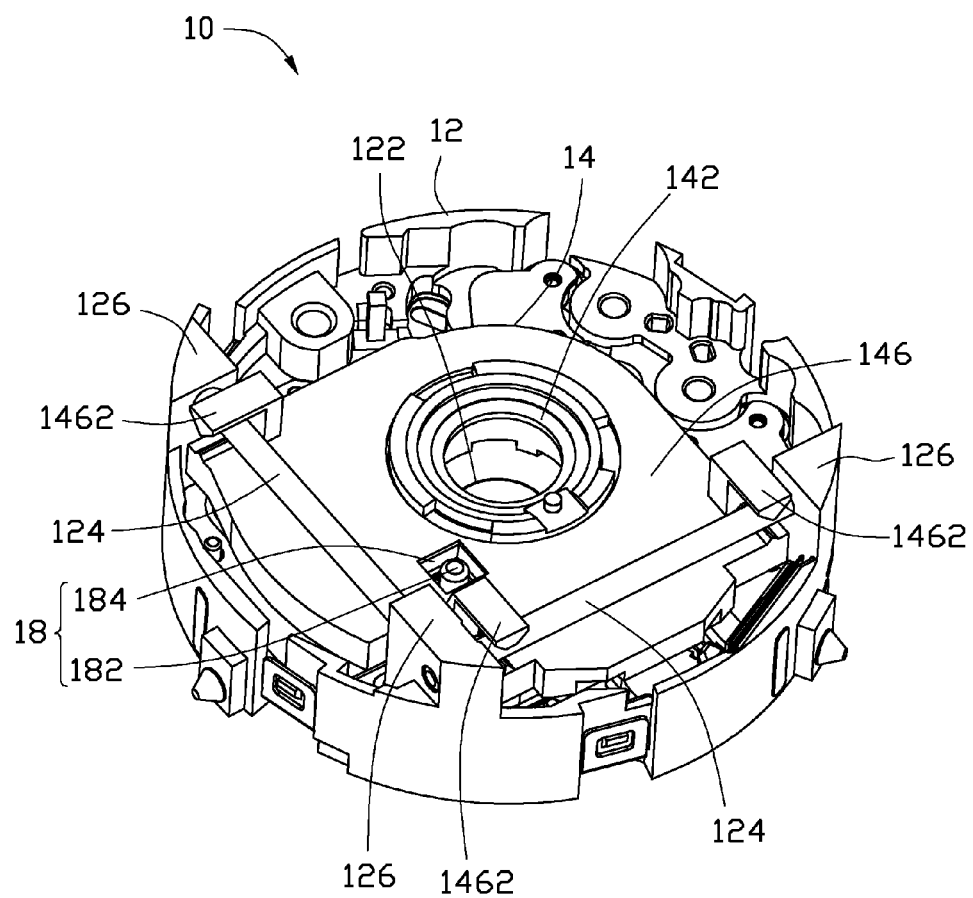
FIG. 1 is a view of the optical anti-shake driving structure of the present disclosure.

Referring to FIG. 1, a driving structure 10 according to an exemplary embodiment, includes a base 12, a sliding platform 14, a driving device 16, and a limiting device 18. A light transmissive hole 122 is positioned at a central position of the base 12, where the light transmissive hole 122 passes through the base 12, allowing light to pass through the light transmissive hole 122. When the base 12 is set between the lens and an image sensor (not shown), the light transmissive hole 122 is a hole for the axis of a lens to pass through. At least two guide rods 124 are set on the base 12, the guide rod 124 is set on the same plane as the base 12, the plane of the guide rod 124 is perpendicular to the light path of light passing through the light transmissive hole 122. In this embodiment, two guide rods are sets on the base 12, the two axial positions of the two guide rods are located in the same plane, the two guide rods 124 having a bearing seat 126 setting through the base 12, the bearing seat 126 is supported at the two ends of the guide rod 124, so that the guide rods 124 are maintained on the same plane. The guide rod 124 is located on the surface of the base 12 where the guide rod 124 is supported by the bearing seat 126, so that between the guide rod 124 and the base 12 has a gap 120, the height of the gap 120 allows the setting of a sliding platform 14. A hole 142 is set on the sliding platform 14, the hole 142 having a lens (not shown). The hole 142 aligned with the light transmissive hole 122 of the base 12, thus the light passing through the light transmissive hole 122 can be projected by the lens inside the hole 142.

Figure 2:
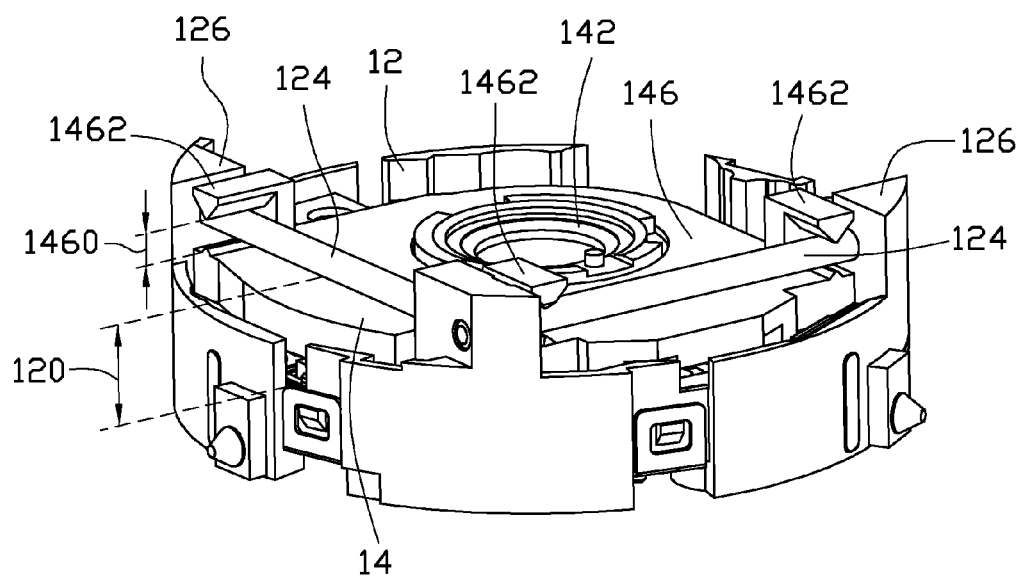
FIG. 2 is a view of the optical anti-shake driving structure of FIG. 1 from another perspective.

The sliding platform 14 includes a first plane 144 and a second plane 146, where the first plane 144 faces the surface of the base 12, and the second plane 146 is located at a rear surface of the first plane 144. The second plane 146 comprises at least three hooks 1462, the hook 1462 being vertically erected on the second plane 146, a hook end of the hook 142 having a spacing 1460 between the second plane 1460, the width of the spacing 1460 being able to accommodate the guide rod 124. The hook 1462 separately hooks on the guide rod 124, enabling the sliding platform 14 to be suspended on the surface of the base 12 (showing in FIG. 2). The hook 1462 slides along the guide rod 124, enabling the sliding platform 14 to move in different directions on the same plane of the base 12. In this way, adjustment of the position relative to the lens is available. In other words, the lens is set inside the hole 142 to adjust the position along with the sliding platform 14, and guides the light emitted from the light transmissive hole 122 to carry out an offset of the optical axis when the handheld device shakes. The hook end of the hook 1462 is a prism, where the contiguous angle part of the prism is suspended on the cylindrical rod of the guide rod 124, to reduce friction between the hook 1462 and the guide rod 124, and facilitate smooth sliding of the sliding platform 12. In the present embodiment, the hook end of the hook 1462 is a triangular prism, using one of the contiguous angles hooked on the guide rod 124.

Figure 3:
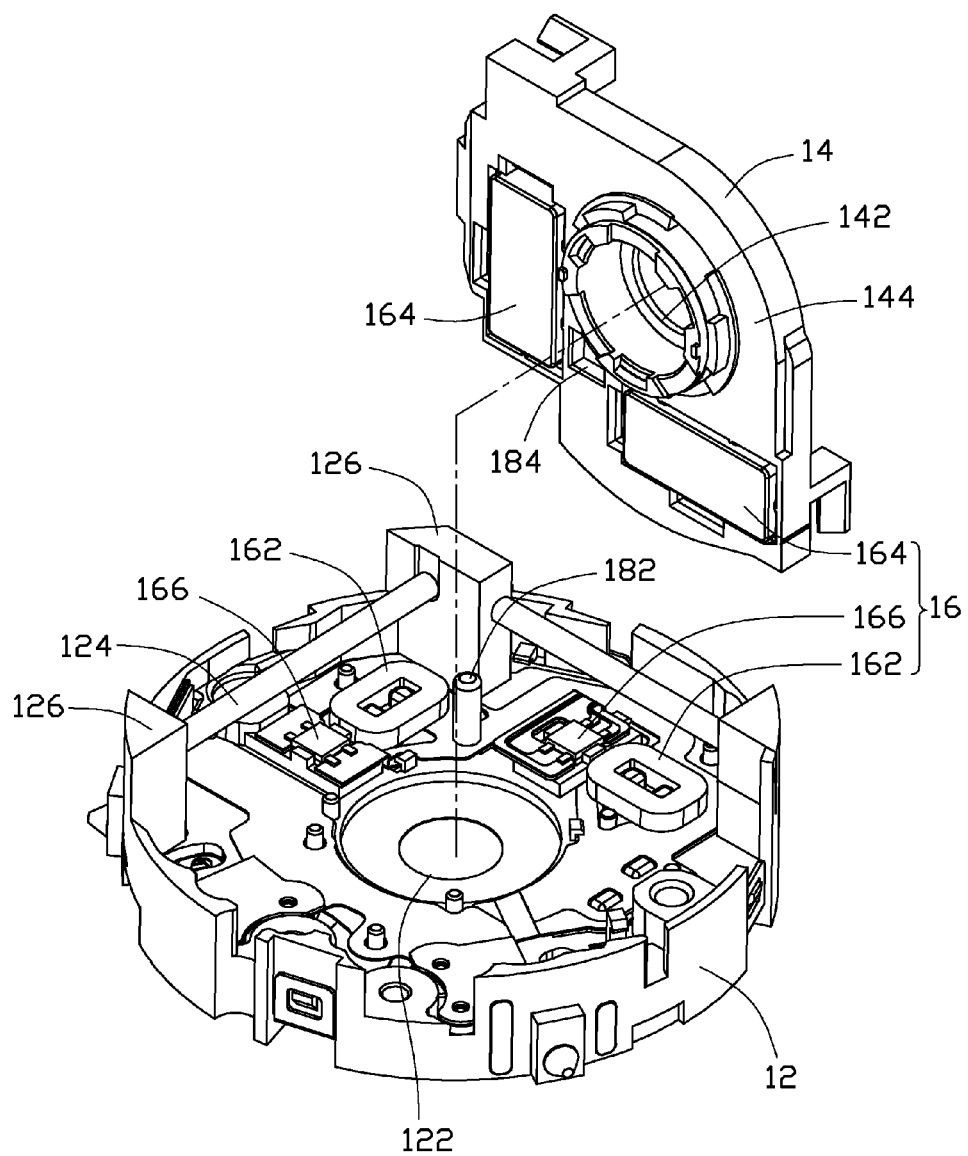
FIG. 3 is a view of the optical anti-shake driving structure of FIG. 1 removed from a base.

The movement of the sliding platform 14 is driven by a driving device 16, the driving device 16 is set on the base 12 between the surface of the base 12 and the first plane 144 of the sliding platform 14. The driving device 16 includes at least two coils 162, at least two magnets 164 and at least two Hall sensors 166. One of the coils 162 and one of the Hall sensors 166 is set on the surface of the base 12, the magnet 164 is set on the first plane 144 (as shown in FIG. 3). When the sliding platform 14 is suspended on the guide rod 124, the surfaces between the first plane 144 and the base 12 oppose each other, thus the magnet 164 opposes the coil 162 and the Hall sensor 166. Through the magnetic effects between the magnet 164 and the coil 162 to generate a driving force, the driving force is applied to the sliding platform 14 to produce the displacement. The magnet 164 opposes the Hall sensor 166, and the Hall sensor 166 senses magnetic flux of the magnet 164, thereby detecting displacement of the sliding platform 14. The amount of the displacement of the sliding platform 14 detected by the Hall sensor 166 is fed back to the control processing system of the anti-shake device (not shown), so that the control processing system can effectively adjust the offset of the lens on the sliding platform 14 for the benefit of the optical axis.

In the present embodiment, the two guide rods 124 which are set on the surface of the base 12 use two coils 162, two magnets 164 and two Hall sensors 166. One of the coils 162, the magnets 164 and the Hall sensors 166 are set to oppose the guide rod 124, so that the two guide rods 124 each have an axial driving element, to drive the sliding platform 14 to decline or to incline, guided by the two guide rods 124. The displacement of the sliding platform 14 is a response to the optical axis deviation generated by any vibration in the handheld device when shooting pictures. Therefore, within the scope of the optical axis deviation caused by shaking, to control the displacement of the sliding platform 14. If the scope of the sliding platform 14 is exceeded, there may be a control failure. Therefore, a limiting device 18 is used to limit the sliding platform 14. The limiting device 18 includes a positioning pillar 182, and a positioning hole 184. The positioning pillar 182 is set on the surface of the base 12, the positioning hole 184 is set on the sliding platform 14, the positioning pillar 182 is located within the positioning hole 184. When the sliding platform 14 is suspended on the guide rod 124, the positioning pillar 182 is fixed on the surface of the base 12, the sliding platform 14 is restricted by the scope of the positioning hole 184, providing a limit to the range of the displacement of the sliding platform 14. The shape of the positioning hole 184 (as shown in FIG. 1) effectively limits the scope of displacement of the sliding platform 14. In the present embodiment, the shape of the positioning hole 184 is rectangular.

In present disclosure of the optical anti-shake driving structure, the sliding platform 14 is suspended on the guide rods 14 wherein both of the guide rods 14 are in the same plane and set on the base 12. The driving device 16 and the limiting device 18 are set on the base 12, to drive and to limit the movement of the sliding platform 14 within the range of any vibration of the handheld device, by adjusting the optical axis equal to any offset caused by shaking The components of the driving structure are simplified, of a greatly reduced thickness, are easy to assembly, as well as lowering cumulative tolerances.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. An optical anti-shake driving structure, comprising:
   a base comprising at least two guide rods, wherein the guide rods are along the same plane on the base;
   a sliding platform suspended on the guide rods and having a lens set within a hole on the sliding platform, the lens aligned with a light transmissive hole of the base;
   a driving device set on the base to drive the sliding platform; and
   a limiting device set on the base to limit the displacement range of the sliding platform, the limiting device comprising a positioning pillar, and a positioning hole, the positioning pillar being set on the surface of the base, the positioning hole being set on the sliding platform, the positioning pillar being located within the positioning hole.

2. The optical anti-shake driving structure as claimed in claim 1, wherein the light transmissive hole passes through the base, allowing light to pass through the light transmissive hole.

3. The optical anti-shake driving structure as claimed in claim 2, wherein the plane of the guide rod is perpendicular to a light path of light passing through the light transmissive hole.

4. The optical anti-shake driving structure as claimed in claim 1, wherein the two guide rods comprises a bearing seat set through the base, the bearing seat is supported at the two ends of the guide rod, so that the guide rods are maintained on the same plane; the guide rod is located on the surface of the base, wherein the guide rod is supported by the bearing seat, so a gap is set between the guide rod and the base, the height of the gap is allowed to set a sliding platform.

5. The optical anti-shake driving structure as claimed in claim 1, wherein a hole is set on the sliding platform, the hole having a lens.

6. The optical anti-shake driving structure as claimed in claim 1, wherein the sliding platform comprising a first plane and a second plane, the first plane facing the surface of the base, the second plane is located at a rear surface of the first plane.

7. The optical anti-shake driving structure as claimed in claim 6, wherein the second plane comprises at least three hooks, the hook being vertically erected on the second plane, a hook end of the hook having a spacing between the second plane, width of the spacing being able to accommodate the guide rod, the hook separately hooks on the guide rod.

8. The optical anti-shake driving structure as claimed in claim 7, wherein a hook end of the hook is a prism, a contiguous angle part of the prism being suspended on the cylindrical rod of the guide rod.

9. The optical anti-shake driving structure as claimed in claim 8, wherein the hook end of the hook is a triangular prism, using one of the contiguous angles hooked on the guide rod.

10. The optical anti-shake driving structure as claimed in claim 1, wherein the driving device comprising at least two coils, at least two magnets and at least two Hall sensors, one of the coils and one of the Hall sensors is set on the surface of the base, the magnet is set on the first plane.

11. The optical anti-shake driving structure as claimed in claim 1, wherein the two guide rods which are set on the surface of the base use two coils, two magnets and two Hall sensors; one of the coils, the magnets 164 and the Hall sensors are set to oppose the guide rod, so that the two guide rods each have an axial driving element.

12. The optical anti-shake driving structure as claimed in claim 11, wherein the shape of the positioning hole is rectangular.

13. The optical anti-shake driving structure as claimed in claim 1, wherein the shape of the positioning hole effectively limits the scope of displacement of the sliding platform.

* * * * *